(12) United States Patent
Light et al.

(10) Patent No.: US 10,675,791 B2
(45) Date of Patent: Jun. 9, 2020

(54) METHOD OF MANUFACTURING A COVER MEMBER SUITABLE FOR A FINGERPRINT SENSOR

(71) Applicant: IDEX ASA, Fornebu (NO)

(72) Inventors: David N. Light, Los Gatos, CA (US); Anne L. McAleer, Impington (GB)

(73) Assignee: IDEX Biometrics ASA, Oslo (NO)

( * ) Notice: Subject to any disclaimer, the term of this patent is extended or adjusted under 35 U.S.C. 154(b) by 211 days.

(21) Appl. No.: 15/693,817

(22) Filed: Sep. 1, 2017

(65) Prior Publication Data
US 2018/0065281 A1    Mar. 8, 2018

Related U.S. Application Data

(60) Provisional application No. 62/382,884, filed on Sep. 2, 2016.

(51) Int. Cl.
| | | |
|---|---|---|
| *B29C 39/10* | (2006.01) | |
| *B29C 39/36* | (2006.01) | |
| *C03B 33/08* | (2006.01) | |
| *B29K 709/08* | (2006.01) | |
| *B29L 31/34* | (2006.01) | |

(52) U.S. Cl.
CPC .............. *B29C 39/10* (2013.01); *B29C 39/36* (2013.01); *C03B 33/082* (2013.01); *B29K 2709/08* (2013.01); *B29L 2031/34* (2013.01)

(58) Field of Classification Search
CPC ....... B29C 39/10; B29C 39/36; C03B 33/082; B29K 2709/08; B29L 2031/34; H01L 21/00
See application file for complete search history.

(56) References Cited

U.S. PATENT DOCUMENTS

| | | | |
|---|---|---|---|
| 4,290,052 A | 9/1981 | Eichelberger et al. | |
| 8,367,475 B2* | 2/2013 | Law ...................... | H01L 24/81 438/113 |

(Continued)

FOREIGN PATENT DOCUMENTS

| | | |
|---|---|---|
| WO | WO 2016060201 A1 | 4/2016 |
| WO | WO 2016060202 A1 | 4/2016 |

*Primary Examiner* — Jacob T Minskey
*Assistant Examiner* — Virak Nguon
(74) *Attorney, Agent, or Firm* — Rothwell, Figg, Ernst & Manbeck, P.C.

(57) ABSTRACT

A plurality of molded cover members are manufactured by first singulating a single sheet of cover material, such as glass, into a plurality of separate, discrete cover members, placing the cover members in spaced-apart positions on a releaseable carrier, and applying a molded material to the perimeter of each cover member. The molded material can be applied by a blanket molding technique whereby gaps between adjacent cover members are filled, and then the cover members are singulated, leaving a portion of the cover material on the perimeter of each cover member, and then the singulated, molded cover members are released from the releasable carrier. Alternatively, the molded material is applied by a patterned molding technique whereby molding material is applied to the perimeter of each cover member without fully filling the gaps between adjacent cover members, and then the molded cover members are released from the releasable carrier.

14 Claims, 5 Drawing Sheets

(56) References Cited

U.S. PATENT DOCUMENTS

| | | | |
|---|---|---|---|
| 8,736,001 B2 | 5/2014 | Salatino et al. | |
| 9,030,440 B2 | 5/2015 | Pope et al. | |
| 9,184,104 B1* | 11/2015 | Chia | H01L 23/481 |
| 9,268,989 B2 | 2/2016 | Pope et al. | |
| 9,449,214 B2 | 9/2016 | Lundahl | |
| 2008/0165158 A1 | 7/2008 | Hotelling et al. | |
| 2011/0221057 A1* | 9/2011 | Lin | H01L 21/78 |
| | | | 257/734 |
| 2013/0108124 A1 | 5/2013 | Wickboldt et al. | |
| 2013/0196472 A1* | 8/2013 | Hoang | H01L 21/02002 |
| | | | 438/118 |
| 2014/0035105 A1* | 2/2014 | Komatsu | H01L 29/06 |
| | | | 257/618 |
| 2014/0057394 A1* | 2/2014 | Ramasamy | H01L 21/561 |
| | | | 438/113 |
| 2015/0123264 A1* | 5/2015 | Napetschnig | H01L 21/78 |
| | | | 257/737 |
| 2015/0279778 A1* | 10/2015 | Camacho | H01L 21/56 |
| | | | 257/737 |
| 2016/0131505 A1 | 5/2016 | Rao et al. | |
| 2016/0300813 A1* | 10/2016 | Zhai | H01L 21/561 |
| 2017/0147852 A1 | 5/2017 | Benkley, III et al. | |
| 2017/0372112 A1 | 12/2017 | Baker et al. | |

* cited by examiner

METHOD OF MANUFACTURING A COVER MEMBER SUITABLE FOR A FINGERPRINT SENSOR

CROSS-REFERENCE

This application claims the benefit under 35 U.S.C. § 119(e) of the filing date of provisional patent application Ser. No. 62/382,884 filed Sep. 2, 2016, the disclosure of which is incorporated herein by reference.

BACKGROUND

Today's mobile devices, smart phones, electronic books, tablet computers, and laptop computers (generically referred to herein as "host devices") typically include a host device panel that comprises a large area of glass (i.e., a glass panel, at least part of which may function as a display and/or input device) constituting a surface of the device. The host device panel may comprise a display device and/or an input device (e.g., a touch screen). Many manufacturers of such devices are keen to incorporate fingerprint sensors into those devices to facilitate user authentication and access to the device. Capacitive fingerprint sensors offer a cost-effective solution. Thermal, ultrasonic or optical fingerprint sensors are alternative solutions.

Fingerprint sensors may not perform well if placed under glass panels of the type typically used in host devices. Glass that provides the necessary mechanical robustness required for a portable, practical consumer device may be too thick and/or may have electrical properties that are not necessarily optimal for the fingerprint sensor to meet specified acceptance/rejection rates. Putting sensors behind the display glass causes a significant and typically unacceptable degradation of the signal to noise ratio ("SNR") for the sensor, and likewise causes increased blurring of the imaged (sensed) fingerprint.

Some manufacturers have used a dedicated cover member that covers the fingerprint sensor only, such as a sapphire window. The host device panel of the host device fits around the dedicated sapphire window. Sapphire is very expensive, however, and therefore increases material costs of the host device substantially.

Another solution in development by several manufacturers is to take a glass host device panel and then machine away or etch away an area that will cover the fingerprint sensor to locally reduce the thickness (i.e. to "thin") that portion of the panel. However, this adversely affects the strength of the glass panel in the thinned region, and can create substantial stress concentration at the transition region between the full thickness glass pane and the thinned region. The thinning process is also costly and difficult to control. It is also difficult to get this thinned region of glass thin enough to prevent excessive degradation of the fingerprint image, both in terms of signal to noise ratio ("SNR") and blurring, and any defects in the transition area from thin to thick glass created in the thinning process can dramatically increase the probability of failure in this region, thereby jeopardizing the robustness of the glass panel.

The present applicant has developed a capacitive fingerprint sensor that will operate effectively, including in terms of SNR and blurring, behind a cover member made of glass, such as strengthened, boroaluminosilicate glass, rather than sapphire, and furthermore is able to meet mechanical robustness requirements such as drop tests, shock and vibration tests, ball drop tests, tumble tests, etc.

This disclosure describes practical manufacturing methods of manufacturing the cover member.

U.S. Provisional Application Nos. 62/258,284; 62/349,256; and 62/374,339, "Electronic Sensor Supported on Rigid Substrate," and U.S. Patent Application Publication No. 2017/0147852 claiming priority thereto, the respective disclosures of which are hereby incorporated by reference, describe "wrapped sensor" designs covered with a glass cover member. Such wrapped sensor designs comprise a rigid substrate wrapped in a flexible circuit subassembly comprising conductive trace sensor elements, a circuit element such as an integrated circuit or application specific integrated circuit ("ASIC"), and conductive interconnects connecting the sensor elements to the circuit element all disposed on a flexible substrate material.

U.S. Provisional Application No. 62/354,210, "Reinforcement Panel for Fingerprint Sensor Cover" and U.S. patent application Ser. No. 15/628,003 (U.S. Patent Application Publication No. 2017/0372112) claiming priority thereto, the respective disclosures of which are hereby incorporated by reference, describe "wrapped sensor" designs covered with a glass cover members reinforced with a ceramic layer to aid robustness.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Figure 1:
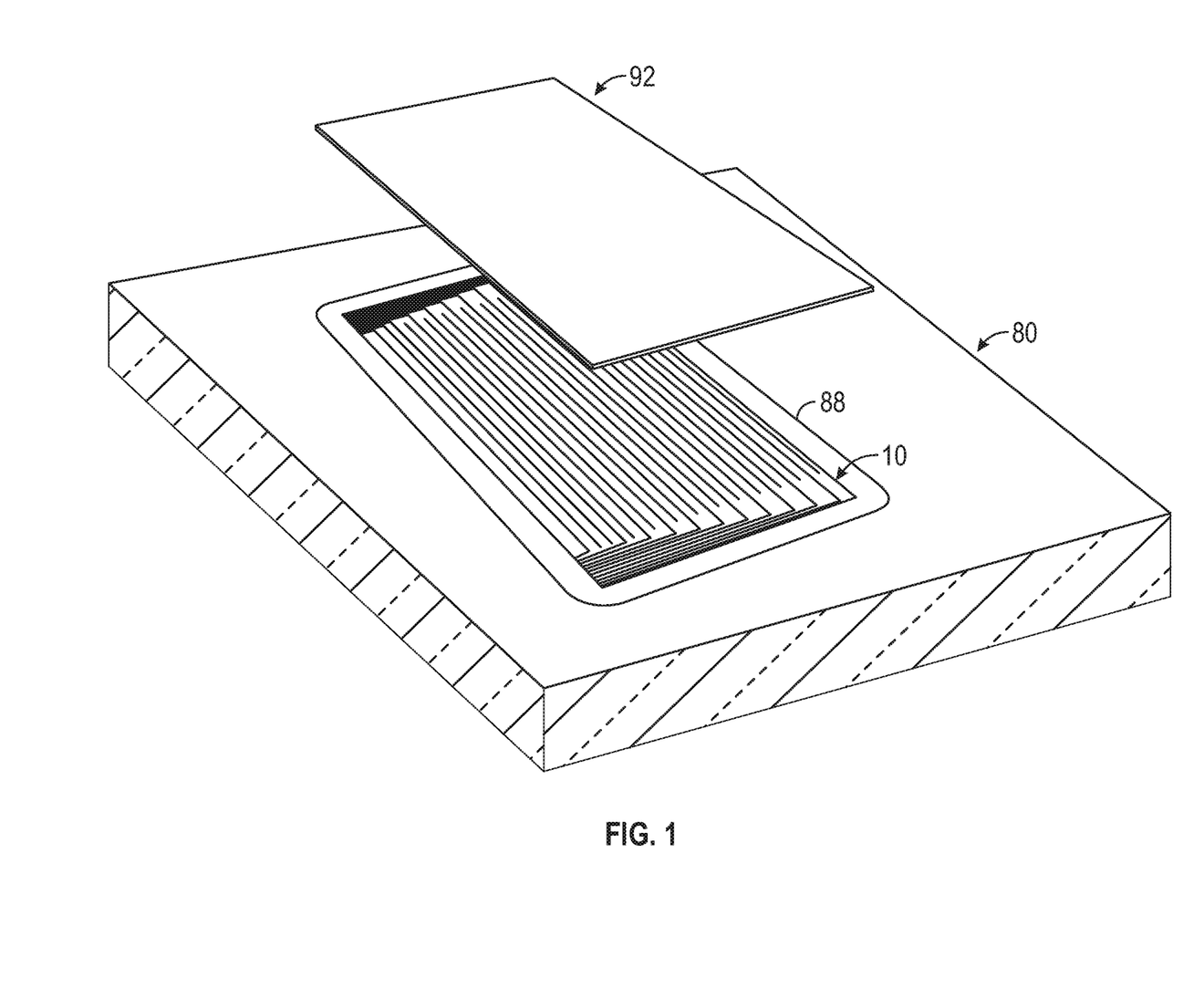
FIG. 1 is an exploded, partial top perspective view of a host device panel with a spacer frame disposed within a cutout and a sensor assembly disposed within the spacer frame and a cover member disposed above the spacer frame and the sensor assembly.

U.S. Patent Application Publication No. 2017/0147852 describes a wrapped flexible sensor that can be covered by a cover member, with optional reinforcement layer, and then incorporated into a mobile device. The glass panel on the mobile device has a cut out to fit around the cover member on the sensor. This is illustrated in FIG. 1 where 80 is the host device panel (e.g., a glass display/interface screen or panel of a mobile device), 10 is the fingerprint sensor assembly disposed in cut out (an opening or recess) formed in the host device panel, 88 is an optional spacer frame around the fingerprint sensor assembly in the cut out in the host device panel, and 92 is a cover member. (A reinforcement layer is not shown in FIG. 1, but could be sandwiched between cover member 92 and sensor 10).

The electric field equivalent vacuum dielectric thickness $T_v$ is a convenient measure of the combined effect on the electric field of a dielectric layer of thickness t and dielectric constant Dk and is given by the formula: $T_v = t/Dk$.

For a given dielectric layer thickness t, as Dk increases, $T_v$ decreases. Ultra-thin glass over sensing elements of a capacitive FPS is used because, for capacitive-type fingerprint sensors, small electric field equivalent vacuum thicknesses ($T_v$) are required between the sensor circuitry and the surface of the finger print of the user. For example, for glass with Dk=7, a thickness of t=500 μm would result in $T_v$=500 μm/7=71 μm. Such a large equivalent vacuum thickness would make it impossible to obtain a satisfactory SNR value, or, in fact, any image of value, for a capacitive sensor. In order to achieve an acceptable SNR value for the sensor, the glass thickness may typically have to be reduced to 100 μm, and perhaps to as little as 70 μm. In the case of 100 μm glass, $T_v$=100 μm/7=14 μm. In the case of 70 μm glass, $T_v$=70 μm/7=10 μm.

However, as the thickness of the glass is reduced to maintain an acceptable imaging capability and SNR value, the mechanical robustness and reliability of the covering glass is also reduced. For example, the glass resistance to impact or to a high localized load is reduced, and the probability of fracture of the covering glass is increased.

Figure 2:
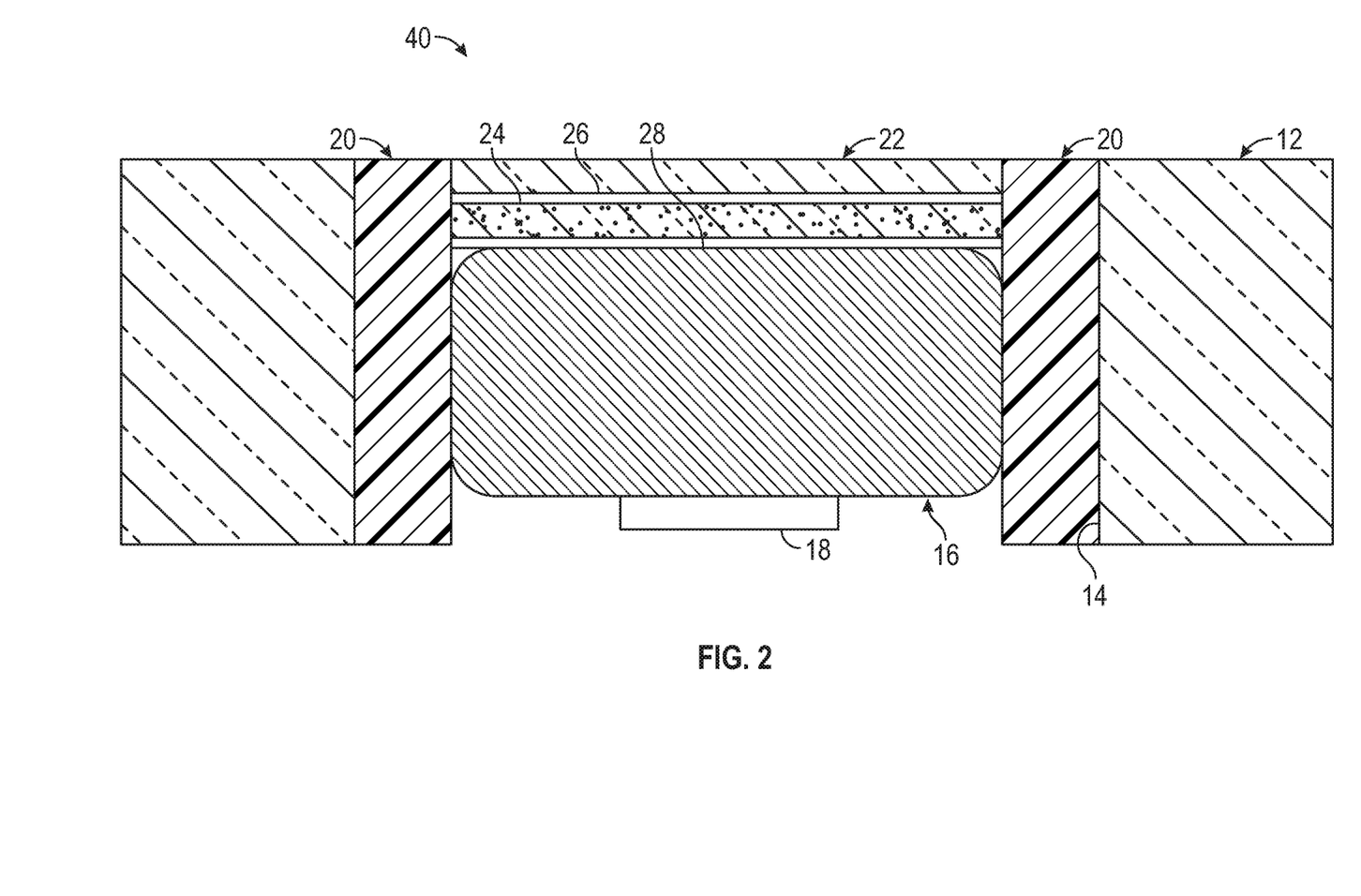
FIG. 2 is a transverse cross-section of a fingerprint sensor installation employing a cover and a reinforcement or supporting panel as disclosed herein.

U.S. Patent Publication No. 2017/0372112 describes exemplary assemblies, one embodiment of which is shown in FIG. 2, to mitigate these problems by incorporating rigid, high Dk reinforcement material between the sensor assembly stack up and the ultra-thin glass cover, or between the sensor and a localized, thinned region of the cover glass designed to house the sensor. To provide sufficient mechanical support, this material has to be sufficiently thick. If the supporting material had a low Dk value, this would degrade the SNR of the sensor, similarly to thickened glass, and render the sensor unusable.

The assembly 40 comprises a cover glass 12 of a user interface screen of a smart phone or similar device having an opening 14 formed therein for receiving a fingerprint sensor or sensor sub-assembly 16. In an embodiment, fingerprint sensor 16 may comprise an assembly including a rigid substrate, such as a glass or ceramic substrate, around which is wrapped a flexible dielectric having formed thereon conductive lines that, when folded over the rigid substrate, cooperate to form a sensor matrix. A circuit element 18, such as an ASIC, may be attached to the flexible substrate and connected to the conductive element. Exemplary embodiments of fingerprint sensors of this type are described in commonly-owned U.S. Patent Application Publication No. 2017/0147852, the disclosure of which is hereby incorporated by reference. Opening 14 may be formed completely through the cover glass 12 or may form a blind hole not extending completely through the cover glass and within which the fingerprint sensor 16 is placed. The fingerprint sensor 16 may be mounted within the opening 14 in a spacer element 20 partially or completely surrounding the fingerprint sensor 16, and the spacer and sensor may be secured within the opening 14 by a suitable adhesive as described in U.S. Patent Application Publication No. 2017/0147852; and U.S. Patent Publication No. 2017/0372112.

The assembly 40 may be configured so that the glass cover 22 is flush with, recessed below, or projected above the top surface of the cover glass 12. A high strength, high dielectric constant ($D_k$) (e.g., $D_k$ greater than 10 and more typically in the range of 15 to 40 or more) reinforcement panel 24 is disposed between the fingerprint sensor 16 and the glass cover 22 and is intimately bonded to the glass cover 22 by an adhesive layer 26. In addition, the reinforcement panel 24 may be secured to the fingerprint sensor 16 by an adhesive layer 28. In various embodiments, the reinforcement panel is at least the same size as the glass cover, so that the glass cover is fully supported by the panel—i.e. no unsupported glass overhangs with respect to the reinforcement panel. With alignment tolerances, that may mean in some embodiments that the reinforcement panel would need to be slightly larger than the glass cover. In other embodiments, reinforcement material and glass would be bonded together first, and then the shape of the cover is cut out from the bonded materials, e.g., by laser, so that the alignment tolerance between glass cover and panel is essentially zero (i.e., no misalignment).

An objective of this disclosure is to provide a structure, materials set, and method of manufacturing the glass cover member (22, 92), optional reinforcement layer (24) and spacer frame (20, 88) in high volumes, suitable for fitting over a fingerprint sensor (16, 10).

The method described is cost effective since it uses readily available manufacturing equipment. The resultant articles produced by techniques described herein meet required tolerances for size, thickness, and flatness required for the fingerprint sensor application, thereby minimizing assembly difficulties when integrated with a fingerprint sensor in a mobile device. It also facilitates use of a thin glass cover member to minimize any negative impact of this member on the fingerprint sensor function, such as signal to noise ratio (SNR).

Tests conducted by the applicant have shown that there are benefits in reinforcing the cover member with a high-dielectric ceramic layer. This additional layer improves the mechanical robustness, function, and reliability of the sensor while minimizing the degradation of the sensor performance. The ceramic layer is typically a monolithic ceramic insert (i.e., a one piece, homogenous ceramic material, rather than a layered material or a composite material (such as a polymer with high $D_k$ ceramic filler)), high $D_k$ ceramic-containing composite inserts, or high $D_k$ ceramic-containing fill materials. This invention describes practical methods of manufacturing this layer and incorporating it with the cover member in a cost-effective and repeatable process.

Further, applicant's tests have shown that the cover member may be more suitably fitted within the host device panel if surrounded by a spacer frame. The spacer frame may be rigid or pliable. Possible materials for the spacer frame include one or more materials selected from the group consisting of: a machinable or moldable plastic, epoxies, modified acrylics, liquid crystal polymers, Polybutylene Terephthalate (PBT), conductive polymers, polymers with carbon or graphite filler, silicone-based materials, polymer foams, silicone foams, conductive thermoplastic or thermosetting molding compounds, conductive foams, and conductive silicones. This invention describes a method of providing the spacer frame around the edge of the cover member.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

Concepts described herein borrow from the concept of 'fan-out wafer level packaging" (FO-WLP). Fan-out wafer level packaging refers to a process typically involving the following steps:

1. Dice a semiconductor wafer into discrete dies. This may in many cases occur after wafer probe (electrical test).

2. The die are picked and placed onto wafer tape or other suitable carrier to reconstitute the wafer with larger spacing between the die. If the wafer has been previously probed, only units passing probe test would be included in the reconstituted wafer.

3. The reconstituted wafer is over-molded to fill gaps between die. Film-assisted molding may be used to prevent the molding compound from encroaching onto the surface of the die.

4. Create interconnect using redistribution circuit layers ("redistribution layer patterning") which extends beyond an original footprint of the die. This is often done to enable a larger interconnect pitch for interconnection of the die to a packaging substrate or printed circuit element.

In various embodiments, some FO-WLP principles are used to create a glass cover member with a molded spacer frame (or gasket/bumper/edge protector) covering some or all peripheral edges of the cover member. This is referred to herein as a molded cover member. This can have advantageous properties relative to glass, such as providing a protective, circumferential 'bumper', and facilitating tight dimensional tolerances on the resulting cover member in the case where a compressible 'bumper' material is used, which can aid later integration.

Figure 3A:
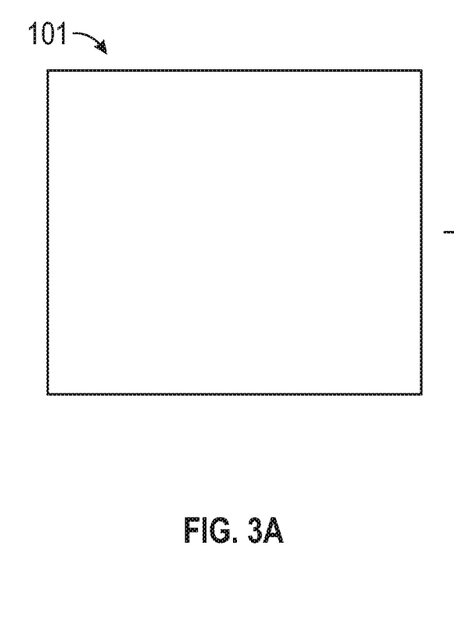
FIGS. 3A-3C show a glass sheet, singulated into separate, discrete cover members.
Figure 3B:
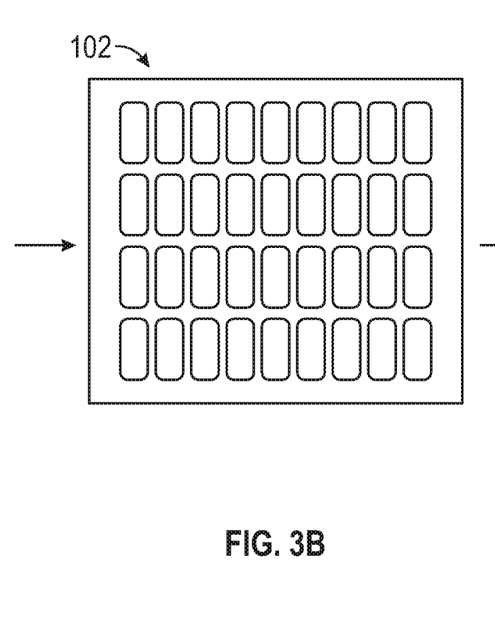
Figure 3C:
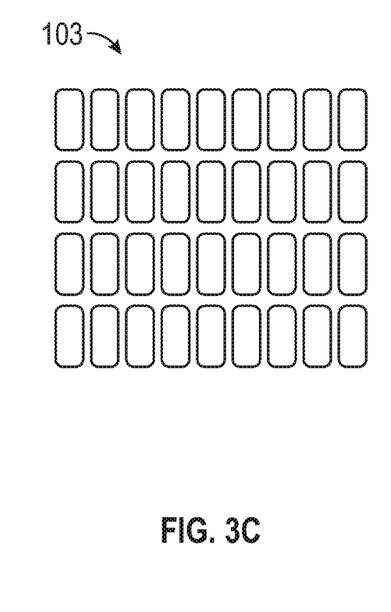
Figure 4A:
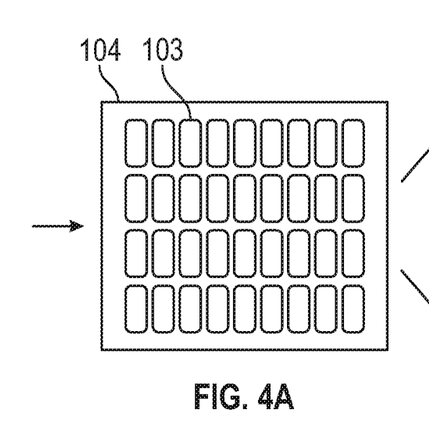
FIGS. 4A-4D show a glass sheet singulated into separate, discrete cover members disposed on a releasable carrier and molded by a blanket molding or film-assisted molding process.
Figure 4B:
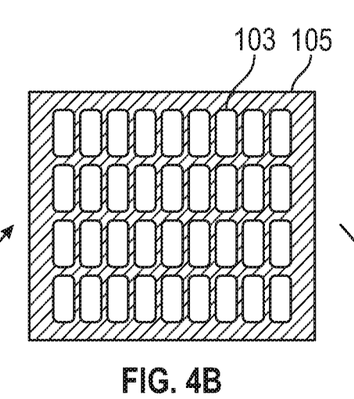
Figure 4C:
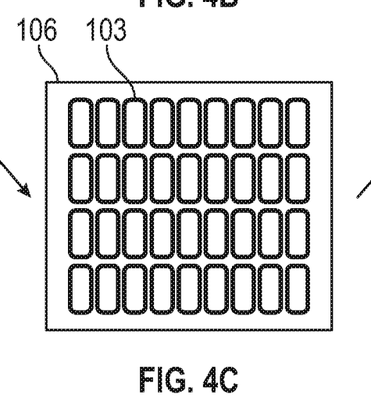
Figure 4D:
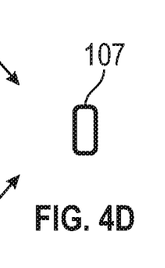

An approach described herein uses the first 3 steps of the generic FO-WLP process described above together with additional steps to create a molded cover member as follows:

1. As shown in FIG. 3, instead of a semiconductor wafer, the process employs a glass sheet 101 (FIG. 3A). For a fingerprint cover application, the thickness of the glass may be 60 to 140 μm, and preferably 70-100 μm. The glass sheet 101 is cut or singulated (step 102) (FIG. 3B) into separate, discrete cover members 103 (FIG. 3C). In this context, "singulate" means the act or process of separating conjoined units into individual parts or pieces, such as the act or process of separating parts into individual units from larger conjoined units, batches, or production runs. One method is to laser singulate (i.e., laser damage and cleave) the sheet to create separate cover members 103. Alternative methods include, but are not limited to laser ablation, mechanical machining, dicing saw, chemical etching, and water jet cutting. It is not necessary that all the separate, discrete cover members be the same size and/or shape as shown.

Figure 5:
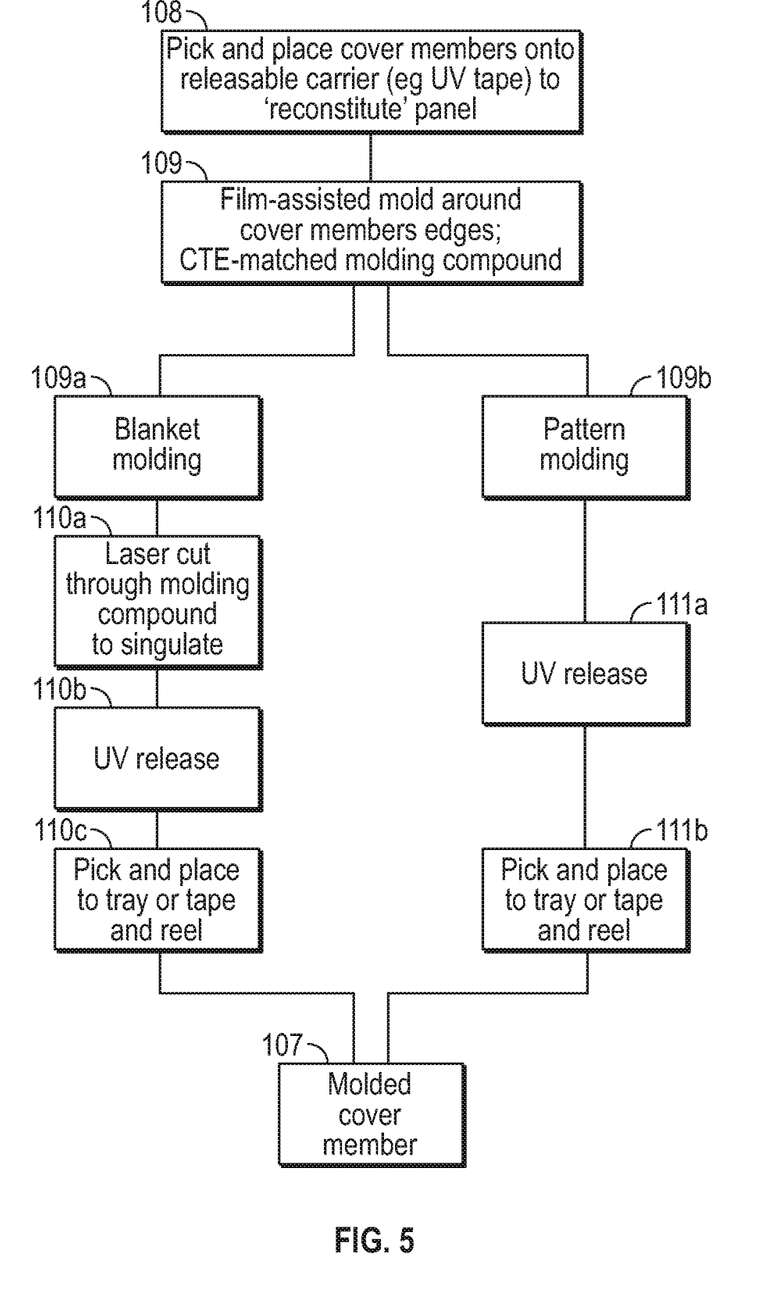
FIG. 5 is a flow chart listing the steps of a process illustrated in FIGS. 4A-4D.

2. As shown in FIG. 4 and FIG. 5, in step 108 pick and place separate cover members 103 onto a releasable fixing medium 104, such as a carrier to reconstitute the glass "sheet". Standard pick and place equipment may be used, such as that used for chip packaging assembly and/or surface mount technology assembly, such as those manufactured by Universal Instruments, Juki Automation, Fuji, Hitachi, Manncorp, Panasonic, and Essemtec, among many other suppliers. A suitable releasable carrier would be a dicing tape, or backing tape, such as UV-releasable tape, but there are other options such as a vacuum chuck, a dissolvable carrier, a heat-releasable carrier tape, etc. The tape or other releasable carrier holds the pieces together in precise locations and is aligned relative to each other during the parallel processing, but allows easy removal from the dicing tape at later stages in the manufacturing process. UV tape is a type of dicing tape in which the adhesive bond is broken or substantially weakened by exposure to UV light of the appropriate wavelength and intensity after dicing, allowing the adhesive to be stronger during cutting while still allowing clean and easy removal after UV release.

In step 108, the individual sensor glass cover members 103 are placed on the fixing medium 104 so as to be separated from each other and such that there is a gap between each cover member and each adjacent cover member.

3. Use a molding process to encapsulate edges of the cover members 103, and preferably, film-assisted molding process 109, whereby a seal film and/or adhesive film would be used to prevent molding compound from leaking onto the surface of the cover member during molding:

a. Either global ('blanket') molding 105 (step 109a) or patterned molding 106 (step 109b) can be used. Blanket molding means molding compound fills all the spaces between the cover members—i.e. the entire gap between adjacent glass cover members is filled—and requires a subsequent singulation operation of the molded cover members (as shown in step 110a), such as by laser cutting through the cured molding compound in order to singulate the cover members after molding and create the finished, molded cover member outline. Other singulation methods could also be used, including mechanical machining, dicing, laser ablation, chemical etching, or water jet cutting. Alternatively, in the patterned molding approach 106, molding compound would be applied locally to the edges of the individual cover members but would not fully encapsulate the gaps between glass cover members, thereby avoiding the need for singulation but rather creating the finished part outline in one step. In both blanket molding approaches and patterned molding approaches, a film-assisted molding process 109 could be advantageous to prevent bleed of molding compound onto the surfaces of the cover member during the molding process.

b. The size of the molded cover member 107 (length and width) may be chosen to give a slight interference fit to a cutout in a host device panel for receiving the molded cover member, depending on the method of integration of the molded cover member into the host device panel. Alternatively, the molded cover member may be sized slightly smaller than the cover glass opening.

c. For either type of molding process 105 or 106, the coefficient of thermal expansion (CTE) of the molding compound may be preferably matched to the glass to minimize stress and warpage during the molding process and subsequent curing or solidification of the molding compound and cooling of the assembly. A low shrinkage molding compound (i.e., one exhibiting a relatively low amount of shrinkage during curing) may also be advantageous to prevent distortion, stress, and warpage of the glass.

4. After singulation (step 110a) or after pattern molding (step 109b), release the molded cover members 103 from the carrier 104. In the case of a carrier made of UV tape, UV light is applied to release the molded cover members from the tape, as in steps 110b and 111a in FIG. 5.

5. Pick and place the molded cover members 107 into trays or into tape and reel carriers (steps 110c and 111b in FIG. 5), such that they are ready for the next step of the manufacturing process. The molded cover members may be integrated into a host device panel, such as a mobile device cover glass (for example, as described in U.S. Provisional Application No. 62/382,864, the disclosure of which is hereby incorporated by reference).

Rather than create molded cover members, Steps 1-5 above could be followed in order to produce molded high dielectric ceramic reinforcement layers, ready to be adhered to the cover member.

Alternatively, prior to Step 1, a high dielectric ceramic sheet could be adhered to the glass sheet, then steps 1 to 5 are followed as described above to produce a two-layer molded cover member. Molding compound would encapsulate the two layers, producing a single part (a molded two-layer cover member) at the end of the process. The bonding of the high dielectric constant ceramic sheet could be accomplished using an appropriate adhesive, or through an alternative process such as anodic (electrostatic) bonding.

Alternatively, the entire cover member may be made of a ceramic material, such as zirconia, and may be processed as above to produce a molded zirconia cover member with the polymer "bumper" for integration into a device cover.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A method for forming a plurality of molded cover members, the method comprising;
  a. singulating a sheet of material into a plurality of separate cover members having peripheral edges;
  b. releasably fixing the separate cover members on a fixing medium so that the individual cover members are separated from each other and there is a gap between each cover member and each adjacent cover member and a gap between cover members and an adjacent edge of the fixing medium;
  c. applying a molding compound into the gaps so that the molding compound adheres only to some or all of the peripheral edges of each cover member to form molded cover members; and
  d. releasing the molded cover members from the fixing medium.

2. The method of claim 1, wherein at least one gap between adjacent cover members is completely filled with a molding compound during step c and further including the step of singulating the molded cover members before step d.

3. The method of claim 2, wherein the sheet of material is singulated into a plurality of separate cover members by a method selected from the group consisting of laser cutting, laser ablation, mechanical machining, dicing saw, chemical etching, and water jet cutting.

4. The method of claim 2, wherein the step of singulating the molded cover members includes laser cutting, mechanical machining, dicing, laser ablation, chemical etching or water jet cutting.

5. The method of claim 1, wherein the fixing medium is a dicing tape, a backing tape, a vacuum chuck, a dissolvable carrier, or a heat-releasable carrier tape.

6. The method of claim 1, wherein the molding is applied using a film-assisted molding process during step c.

7. The method of claim 1, wherein step d comprises releasing the molded cover members from the fixing medium using UV light.

8. The method of claim 1, wherein the sheet has a thickness of 60-140 µm.

9. The method of claim 1, wherein the step of singulating the sheet of material during step a includes laser ablation, mechanical machining, dicing saw, chemical etching, or water jet cutting.

10. The method of claim 1, wherein the sheet of material comprises glass.

11. The method of claim 1, wherein step c comprises a blanket molding process to completely fill the gap between each cover member.

12. The method of claim 1, wherein step c comprises a patterned molding process to apply the molding compound locally to some or all of the peripheral edges of each cover member without completely filling the gap between each cover member.

13. The method of claim 1, wherein the sheet of material comprises a high dielectric ceramic sheet adhered to the glass sheet.

14. The method of claim 1, wherein the sheet of material comprises ceramic.

* * * * *